United States Patent

[11] 3,607,420

[72] Inventor Leonard H. Cutler
 Philadelphia, Pa.
[21] Appl. No. 871,582
[22] Filed Nov. 17, 1969
[45] Patented Sept. 21, 1971
[73] Assignee E. I. du Pont de Nemours and Company
 Wilmington, Del.
 Continuation of application Ser. No.
 609,776, Jan. 17, 1967, now abandoned.

[54] PROCESS OF OPERATING FUEL-CELL HALF CELL WITH CUPRIC-CUPROUS REDOX COUPLE
 1 Claim, No Drawings
[52] U.S. Cl. .................................................. 136/86
[51] Int. Cl. ............................................. H01m 27/26
[50] Field of Search .......................................... 136/86
[56] References Cited
 UNITED STATES PATENTS
 2,696,513 12/1954 Lehovec ..................... 136/86 UX
 3,360,401 12/1967 Grasselli et al. .............. 136/86

OTHER REFERENCES

Hodgman; C. D. et al. Handbook of Chemistry and Physics 25th Ed. 7/1941, pg. 1335

Gleued et al. " Experiment on Utilization of Hydrogen Combustion for Producing Electrical Energy in Gas Cells," in Beuchte Ges. Kohlentechn., 4; pp. Front Page 16, 17 of Translation. 7/1942

*Primary Examiner*—Allen B. Curtis
*Attorney*—Herbert M. Wolfson

ABSTRACT: A redox cathode system of an electrical conductor immersed in an acidic solution containing cupric chloride and excess chloride ions is disclosed for use in fuel cells. The system is isolated from the anode system by an ion-exchange membrane; and an anode having catalytic material associated therewith and an acid anolyte are employed. An organic hydrogen-containing fuel, e.g. formaldehyde, and an oxygen-containing oxidant, e.g. air and hydrogen peroxide, are preferred.

PROCESS OF OPERATING FUEL-CELL HALF CELL WITH CUPRIC-CUPROUS REDOX COUPLE

This application is a continuation of application Ser. No. 609,776 filed Jan. 17, 1967, now abandoned

SUMMARY OF INVENTION

A fuel cell in which the cathode system comprises an electrical conductor immersed in an acid solution of cupric chloride and excess chloride ions.

This invention relates to improved fuel cells and more particularly, the invention relates to an improved cathode system for use in fuel cells.

Fuel cell, as used herein, refers to a device capable of generating electrical energy from the oxidation of a fuel. Fuel cells usually comprise a housing, two electrically conductive electrodes consisting of or impregnated with catalytic material, connecting means associated with each electrode for establishing electrical contact with an external circuit and at least one electrolyte which acts as a transferring medium for ions. An oxidizing gas such as air is supplied to the oxidant electrode (the cathode); and a fuel, such as hydrogen, methanol, formaldehyde, etc. is supplied to the fuel electrode (the anode). At the cathode, electrons are consumed to convert the oxidant into ions, and at the anode, the fuel is oxidized with the release of electrons. There is, therefore, a net flow of electrons from the anode to the cathode through the external electrical-conductive circuit.

Another type of fuel cell is the so-called "redox" fuel cell. The "redox" fuel cell has been defined as one in which a pair of "redox" electrodes are employed. Such electrodes are described as the combination of an electrolyte solution containing both the reduced and oxidized forms of an ionic species in contact with an electrical conductor. In the "redox" fuel cell, the fuel and the oxidant consumed are not necessarily reacted at the electrodes.

In its broadest sense, the present invention provides a novel "redox" cathode, i.e. an electrical conductor immersed in a catholyte consisting essentially of a reducible salt. Specifically, the preset invention involves the use of an acidic solution containing cupric chloride (reducible to cuprous chloride) and excess chloride ions as the catholyte, the catholyte being isolated from the anode system by a membrane, and any anolyte used being of a different chemical composition from that of the catholyte.

While the above-defined "redox" cathode can be used with a "redox" anode, i.e. an electrical conductor immersed in an anolyte consisting essentially of an oxidizable salt or similarly oxidizable material, the preferred fuel cell of the present invention uses a "redox" cathode in combination with a catalytic anode. The anode may contain or be formed of such materials as platinium, palladium, rhodium, silver or compounds thereof. The preferred anode is disclosed in U.S. Pat. application Ser. No. 609,777 filed Jan. 17, 1967, now U.S. Pat. 3,492,164 to W. R. Wolfe, Jr. This anode is an electrically conductive base stratum having associated therewith a catalytically effective amount of an acid-insoluble solid material composed of at least one oxide of molybdenum and at least one sulfurated compound of molybdenum, the oxide having the formula $MoO_x$, wherein "x" has a value of 2–2.88, at least the exposed regions of the solid material containing the sulfurated compound of molybdenum, the ratio of oxygen-to-sulfur in the solid material being 36:1–1:36.

Thus, the preferred fuel cell of this invention comprises a housing, at least one fuel electrode (anode) having catalytic material associated therewith, a catholyte of cupric chloride in hydrochloric acid isolated from the anode usually by an ion-exchange membrane, the concentration of cupric chloride being at least 20 grams per liter and the concentration of the acid being at least 1 percent, at least one electrical conductor immersed in the catholyte, means for introducing an oxidant into the catholyte, means for introducing a fuel in proximity to the anode, and connecting means associated with at least one anode and at least one conductor in the catholyte for establishing electrical contact with an external circuit. Usually, an acidic anolyte is associated with the anode to form the anode compartment of the fuel cell and the catholyte is isolated from the anode compartment by a proton permeable membrane.

The cathode system of the present invention will operate continuously over extended periods without any substantial degradation in half-cell potential. With some oxidants, half-cell potentials as high as 1.2 volts can be obtained. It should also be understood that the cathode system is operable with any electron source whether it is the anode system of a fuel cell or a battery.

A particularly useful design using the principles of the present invention involves a bi-polar electrode. When such electrodes are assembled in series with gaskets to insulate the material between each bi-polar electrode, a series of cells is formed which does not require any external current connections except at each end of the cell. Anolyte containing formaldehyde in 10 percent hydrochloric acid may be introduced adjacent the anode. The formaldehyde, as it passes up through basis cell, loses protons through the ion-exchange membrane as it is catalytically oxidized on the electrode surface losing electrons directly through to the adjacent cathode. Any suitable catalyst which will convert a fuel at the anode surface on the bi-polar electrode separator can be used in this manner. As the fuel passes through the anode compartment, it is converted to carbon dioxide which is discharged to a chamber outside the cell for refueling and decarbonation. The exterior chamber contains a reservoir which can be supplied with an excess of fuel and acid to be repumped on a continuous recycle basis to the anode. Similarly, the catholyte comprising the hydrochloric acid solution of copper II anion may be pumped from the reservoir into the cathode compartment where electrons from the adjacent anode are used to reduce the catholyte to copper I as it passes through the cell. Dissolved oxygen in the catholyte reoxidizes cuprous ion to cupric ion and combines with protons at the membrane surface to form water which is discharged at the reservoir while a fresh supply of oxygen from the air is dissolved therein. The recycling catholyte and anolyte may flow in a parallel or series arrangement. In a series arrangement, the electrolyte would pass through every cell before it returned to the reservoir.

ANODE CATALYST PREPARATION

Generally, any method for incorporating oxides with sulfides or oxysulfides is suitable for the preparation of the preferred catalyst. The preferred method of preparing the catalyst involves treating a molybdate such as ammonium heptamolybdate $(NH_4)_6Mo_7O_{24} \cdot 4H_2O$ with a sulfurizing compound such as elemental sulfur or a reactive sulfide, e.g. hydrogen sulfide, in a reducing atmosphere to convert the metal salt to the oxide of molybdenum coated with the oxysulfide or sulfide of molybdenum. The product normally contains some elemental sulfur as well which can be removed if desired. The conversion can be carried out on the surface of a conductor, e.g. on porous carbon, to form the electrode with its associated catalyst and thus, avoid a subsequent step of applying catalyst to the electrode.

Other methods of producing the catalyst involve oxidizing molybdenum disulfide or sulfurizing an oxide of molybdenum by reaction with sulfur or hydrogen sulfide or by heating a mixture of sulfides and oxides at elevated temperatures, e.g. 400°–600° C. Still another method involves treating a suspension of the oxide with a solution of the sulfide to yield the insoluble product. Where the oxide of molybdenum is used as a starting material in the preparation of the catalyst, it can be any of the stoichiometric oxides ($MoO_2$, $MoO_3$) or non-stoichiometric oxides ($Mo_4O_{11}$, $Mo_8O_{23}$, $Mo_9O_{26}$, etc.). However, the formulation of the oxide of molybdenum in the final product will range from $MoO_2$ to $Mo_8O_{23}$, i.e. $MoO_x$ where "x" is 2–2.88.

Still another possible method for preparing the catalytic material involves intimately mixing the oxide of molybdenum molybdenum disulfide. Simple mixing by hand or by tumbling the materials in a drum does not produce material that is operable as a catalyst no matter how thorough the mixing. However, milling them with large (½-inch) ceramic balls may produce sufficiently high energy to yield an operable catalyst, i.e. may produce sufficient force and heat to bring about intimate mixing of the compounds.

ANODE PREPARATION

The anode for use in the preferred fuel cell of this invention is composed of a base stratum that is usually an electrically conductive material, chemically resistant to the anolyte, which supports the previously described catalytic material. Although any electrically conductive material including gold and those metals of Group VIII of the Periodic Table that are resistant to the electrolyte would be operable, it is preferred to use materials that are relatively inexpensive in order to retain the basic advantages of the preferred catalyst. Thus, some transition metals, like tungsten and tantalum, may be used as such or in alloys thereof, e.g. stainless steel, nickel-aluminum alloys, etc. In addition, suitable electrodes may be formed from metal oxides, carbon, carbides, conductive ceramics, conductive polymeric compositions or the metal/silicon combinations disclosed in U.S. Pat. Application Ser. No. 404,435, filed Oct. 16, 1964. The electrode base stratum may be used in sheet, rod or cylinder form or, preferably, in the form of a porous or foraminous base e.g. screen, mesh, wool, etc. to provide maximum surface area.

The catalytic material may be incorporated in a binder and the combination may be applied to the electrically conductive base stratum under pressure. As the binder material, such polymers as chlorinated butyl rubber, polystyrene, polymethyl methacrylate, polyethylene terephthalate, polyvinyl chloride, polyvinyl fluoride, polytetrafluoroethylene and other fluorocarbon polymers, polyurethanes, polybutadiene, polyisoprene, polyamides, polyimides, chlorosulfonated polyethylene, chlorinated polyethylenes, and the like may be used.

In a very desirable system, described previously, the catalytic material is used as part of a bi-polar conductor system. Bi-polar conductor systems offer the following advantages: the fuel cell design is simplified; the construction can be compact; and external cell connection losses are minimized. The bi-polar electrode may be formed from the materials useful in the present invention by depositing the catalytic material on a support of porous graphite or carbon or the like, the supporting material acting as one side (the anode) of a conductor while the reverse side acts as the cathode.

It should be understood, however, that it is not necessary that the catalytic material be incorporated with the electrode. Particles of the catalytic material may be suspended in the anolyte (the electrolyte in contact with the anode) as described in U.S. Pat. Application Ser. No. 348,165, filed Feb. 28, 1964. Alternatively, the catalytic material, being electrically conductive, can be used as the electrode itself. Specifically, it can be pressed, with or without a polymeric binder, into a form for receiving an electrical lead; or it can be used in particulate form in a gas dispersion tube.

ANOLYTES

The electrolytes used in the anode section of the fuel cells (the anolyte) can be any of those commonly used which are compatible with the particular fuels, permeable membranes, etc. being used. They will usually be aqueous mixtures of adequate conductivity for the ions involved in the half cell reactions. The useful aqueous electrolytes include solutions of the common acids e.g. sulfuric acid, phosphoric acid, hydrochloric acid. The concentrations involved will usually be chosen for high conductivity and convenient handling. Specifically, 5%–45% sulfuric acid, 10%–85% phosphoric acid and 3%–15% hydrochloric acid are recommended.

PROTON PERMEABLE MEMBRANES

It is important for the successful operation of the fuel cell to incorporate in the fuel cell design a suitable membrane which separates the electrolytes but permits adequate flow of ions between the half cells. A preferred class of ion-exchange membranes for use in the fuel cell of this invention are thin films of fluorinated copolymers having pendant sulfonic acid groups, preferably the copolymers of trifluorovinyl sulfonic acid and fluorinated ethylenes, as disclosed in copending U.S. Pat. Application Ser. No. 530,295, filed Feb. 28, 1966. By using a suitable ion-permeable membrane, the anode compartment can utilize a soluble fuel in the electrolyte while the other half cell utilizes a gaseous oxidant, the membrane serving primarily to prevent migration of the soluble fuel to the cathode.

FUELS AND OXIDANTS

While the fuel cells described herein are particularly useful with low molecular weight hydrogenous fuels, the invention is not so limited. Besides hydrogen, the useful fuels include nitrogen-containing fuels like ammonia and hydrazine; oxygenated hydrocarbon fuels like formaldehyde, methanol, formic acid; and carbon monoxide. The fuel may consist of one or more of the foregoing materials. For example, natural gas, which is a mixture of hydrogen and methane, and reformed natural gas, which is a mixture of hydrogen, methane and carbon monoxide, are useful fuels. The selection of the particular fuel to be used will depend upon its availability and its degree and ease of oxidation in the presence of the particular electrolyte. In any event, the fuel should not react directly with the anolyte or with the materials of cell construction.

The oxidizing agents that can be used are preferably air and pure oxygen. Other oxidants which may be used include chlorine, liquid hydrogen peroxide, liquid organic peroxides, etc.

CATHODE SYSTEMS

The cathode system is composed of an electrical conductor which will accept electrons, in combination with the aforementioned catholyte. Suitable conductors are well known and many are described for example in Catalysis, Inorganic and Organic, Berkman, Morrel, and Egloff, Reinhold Publishing Co., New York (1940). They include conductors formed from metals of Group VIII of the Periodic Table such as rhodium, palladium, iridium and platinum. In addition to these metals, the conductors can be formed of platinum or palladium deposited on a base metal such as stainless steel, iron, nickel and the like. They may also be formed from metal oxides or from carbon which is activated with platinum or palladium. The preferred materials for use with the cupric chloride-hydrochloric acid catholyte systems of this invention are those relatively inexpensive materials disclosed with reference to the anodes, e.g. tantalum, carbon (graphite), and conductive plastic materials, e.g. conductor-filled polyfluorinated hydrocarbons, etc. It should be understood that these materials may be used in sheet form or in the form of screens, meshes, or porous metals.

The catholyte is usually a solution of cupric chloride which is complexed with an excess of chloride ions. It is thought that the complex formed is the tetrachloro copper II anion. However, it may be some other unknown species. Experience indicates that this complex species forms only in the presence of acids or protons. A suitable way for preparing the catholyte solution is the disolution of copper with a trace of cupric chloride in hydrochloric acid in the presence of air or the dissolution of cupric chloride dihydrate in hydrochloric acid. Solutions formed from cupric chloride in water in the presence of an excess of chloride ions supplied by the addition of a chloride salt will operate under certain conditions in the presence of protons. Proton-free catholytes are slow in operation when combined with an anode employing a hydrogenous fuel since there is a delay in proton migration to the cathode side. The concentration of cupric chloride in solution has been varied successfully between 20 grams per liter and saturated solutions wherein solid cupric chloride is present. These solutions may vary in acid concentration from 1% hydrochloric acid up to saturated hydrochloric acid.

The temperature of operation of the fuel cell can range from about 20° C. to about 150° C., preferably 65°–115° C., the pressure being atmospheric or slightly above to raise the boiling point of the catholyte. In general, more current can be drawn from a fuel cell at a constant potential when the temperature is increased. However, at temperatures above about 150° C. the corrosive action of the acidic electrolytes on metals in the fuel cell is accelerated.

The following description is believed to explain the operation of the fuel cell of this invention. Electrons originate at the anode and pass through a work source arriving at the cathode electrode surface. This surface is immersed in and in contact with cupric chloride complexed ions which are immediately reduced to cuprous chloride or the dichloro copper I anion. The copper I ion then moves away from the electrode surface and is contacted with oxygen either within the cell compartment or at some exterior location where it is converted to the complexed copper II anion. At the same time the oxygen is converted in the presence of protons to water. The detailed reactions are thought to proceed as follows:

1. 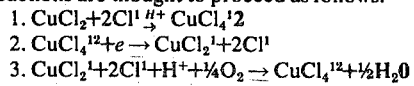
2. $CuCl_4^{-2} + e \rightarrow CuCl_2^{-1} + 2Cl^{-1}$
3. $CuCl_2^{-1} + 2Cl^{-1} + H^+ + \tfrac{1}{4}O_2 \rightarrow CuCl_4^{-2} + \tfrac{1}{2}H_2O$ Summarizing these equations: Equation (1.) gives the formation of the complex ion and by the algebraic addition of Equations (2.) and (3.), the cathode reaction becomes:

(4)
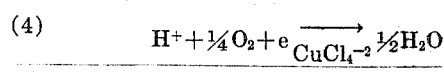

Water generated by the electrochemical reactions should be removed to avoid undue dilution. This can be conveniently done at a temperature above 100° C. by having the entire cell attached to a condenser which selectively removes the proper amount of water.

The invention will be more clearly understood by referring to the examples which follow. These examples should not be considered to limit the invention in any way. Parts and percentages in the examples are by weight, unless otherwise stated.

EXAMPLE 1

Into a standard two compartment glass fuel cell laboratory module separated by a proton exchange membrane (manufactured by American Machine and Foundry, sold as AMF type C–310), was placed a standard lead anode in 10% sulfuric acid, a 1-inch square tantalum cathode and a standard glass frit oxygen sparger. The catholyte was solution containing 75 grams of $CuCl_2 \cdot 2H_2O$ in 250 cc. concentrated HCl. This solution was then diluted by 250 cc. of distilled water. Oxygen was bubbled in under a pressure of about 2 lbs. per square inch to cause vigorous bubbling in the catholyte. The cell operated over a period of 4 hours. Readings on the cell were as follows:

Open circuit half-cell (v. S.C.E.) potential measured 0.6 v.; at a current of 17 milliamperes the voltage was 0.37 v.; while at 62 milliamperes a voltage of 0.32 v. was obtained.

EXAMPLE 2

Employing a standard cell as described in example 1, the catholyte consisted of 80 grams of cupric chloride dissolved in 500 cc. of hydrochloric acid made by diluting 250 cc. concentrated HCl in 250 cc. of water. The cathode electrode was a ½-inch diameter carbon rod 3-inch long immersed in the catholyte. The cell was operated with air at a temperature of 65° C. for a period of 187 hours or an equivalent of 40,400 milliampere hours. Due to water which built up due to in-leakage from the anode compartment, and as a result of the reaction, the catholyte was drained periodically to maintain constant volume during the run. The final copper concentration in the catholyte was 40 grams of cupric ion per liter with no cuprous ion detectable. The final concentration of hydrochloric acid was 44 grams per liter. A summary of typical results and readings are in the following table:

| Current (milliamperes) | Cathode (v. S.C.E.) Potential (Volts) |
|---|---|
| 0 | 0.64 |
| 100 | 0.44 |
| 400 | 0.36 |
| 800 | 0.28 |
| 900 | 0.27 |

EXAMPLE 3

Into a standard laboratory module as described in example 1 was placed an anolyte comprising 500 cc. of 10 wt. percent sulfuric acid and 10 wt. percent formaldehyde (37% formaldehyde commercial solution). Into this was placed a 1 sq. in. circular anode constructed as follows:

Ammonium heptamolybdate, $(NH_4)_6Mo_7O_{24} \cdot 4H_2O$, and elemental sulfur were mixed in a 5.5 to 1 weight ratio. The mixture was put into an alumina combustion boat which in turn was inserted into a quartz tube in a tubular furnace. The mixture was heated to a temperature of 450° C. in a hydrogen atmosphere to produce a powder. The powder was acid-insoluble and the ratio of oxygen-to-sulfur in the the powder was 10:1. The powder was then mixed with 20% by volume of a polyimide powder and the mixture was pressed onto a tantalum screen using 100,000 p.s.i. to form the electrode. The tantalum screen was 1-inch in diameter.

The membrane in the cell was a polysulfonated perfluorohyrocarbon compound described in pending U.S. Pat. Application Ser. No. 530,295, filed Feb. 28, 1966. The catholyte was the same as described in Example 2. The cell was operated at 65° C. Typical readings are as follows:

| Current (Milliamperes) | Cathodes Potential v.S.C.E. (Volts) | Cell Potential (volts) 0 |
|---|---|---|
|  | 0.56 | – |
| 50 | 0.47 | 0.33 |
| 100 | 0.43 | 0.21 |
| 150 | 0.40 | 0.21 |

EXAMPLE 4

Employing a standard laboratory glass module as described in Example 1, a cathode comprising 500 cc. of 2.5 normal hydrochloric acid having dissolved therein 240 grams of cupric chloride dihydrate, a graphite disk, one-eighth inch thick and 2½ cm. in diameter, masked off on one side with a nonconductive material and an air sparger bubbler comprising a glass disk. The membrane was AMF type C–310. In the anode compartment, the anolyte comprised 400 cc. 2.5 normal hydrochloric acid containing 150 cc. of a commercial 37% formaldehyde solution. Into this solution was immersed a catalyzed disk described in Example 3, having 2½ cc. diameter with one side masked with nonconductive material. The side was held very close to the membrane separating the two compartments. This cell operated for a period of 20 hours at a 5 second on—5 second off cycle at a temperature of 90° to 100° C. During the first three hours of operation at 40 amps per square foot, equivalent to 12 watts per square foot, the operation was quite regular. However, the performance tapered off during the remainder of the time period. Initially the open circuit voltage for the cell was 0.71 volts. The cell voltage initially operated at 0.33 volts at 100 milliamps equivalent to 25 watts per square foot. At the end of 20 hours, the wattage dropped off to 6 watts per square foot.

EXAMPLE 5

Employing a laboratory cell module described in Example 1 using a platinum electrode anode driven by an external power supply in 10% sulfuric acid, an AMF type C-310 ion exchange membrane and a graphite rod having 16 sq. cm. of exposed surface as the cathode immersed in a catholyte starting solution made by dissolving 720 grams of cupric chloride dihydrate in 1 liter of 1—1 hydrochloric acid, the following currents were observed:

Air Used as Oxidant

| Current for the cell (milliamps) | Current density cell (amperes/sq. ft.) | Half cell (vs. SCE) potential (volts) |
|---|---|---|
| 0 | | .57 |
| 150 | 9 | .54 |
| 250 | 15 | .52 |
| 500 | 35 | .48 |

Using Chlorine Gas as Oxidant
(2 hours operating time at 15 amps per sq. ft.)

| | | |
|---|---|---|
| 0 | | 1.02 |
| 250 | 15 | 0.52 |

EXAMPLE 6

An experiment was run in a beaker to demonstrate the effectiveness of peroxide with a catholyte to produce current. A one liter beaker was filled with 500 cc. of 1—1 hydrochloric acid having dissolved therein 113 grams of cupric chloride dihydrate at room temperature. A graphite rod as described previously having 16 sq. cm. of surface area was used as an electrode and a standard calomel electrode was used in conjunction with it. With no air bubbling through the catholyte, the open circuit potential versus standard calomel electrode read 0.35 volts. After air was bubbled through using a glass fritted sparger as described previously, the open circuit potential read 0.61 volts. After one additional hour with pure oxygen being bubbled through the same solution, an open circuit potential of 0.61 volts was measured. Into the same solution after oxygen bubbling was stopped, 20 cc. of concentrated hydrogen peroxide was added to the catholyte, raising the open circuit potential to 1.21 volts.

I claim:

1. In a process for operating an independent electrochemical oxygen-reducing fuel cell half-cell arrangement which utilizes a cupric-cuprous redox couple wherein cuprous complex anions are converted to cupric complex anions by a continuously supplied stream of an oxidant to achieve an open circuit half-cell potential of at least 0.56 volts (v. S.C.E.) at 65° C., said process further comprising maintaining an electrical conductive electrode member in contact with an acidic catholyte having an excess of chloride ions, and maintaining in said catholyte a cupric-cuprous redox couple, said process further comprising during closed circuit conditions supplying electrons to the electrode member and converting cupric complex anions in the catholyte and in operative association with said electrode member to cuprous complex anions, said catholyte formed by dissolving cupric chloride, essentially free of cuprous chloride, in hydrochloric acid, the concentration of cupric chloride being at least 20 grams per liter, the concentration of the hydrochloric acid being at least 1%, and said electrode member being formed of graphite; the improvement which comprises maintaining the temperature of the catholyte, just prior to and during operation of the half cell, between about 65° C. and about 115° C. and continuously supplying sufficient amounts of oxidant and sufficiently well distributing said oxidant throughout the catholyte just prior to and during closed circuit operation to convert the cuprous complex anions back to cupric complex anions substantially instantaneously to prevent a buildup of any significant amount of nontransitory cuprous complex anions in the catholyte.